United States Patent
Gupta et al.

(10) Patent No.: US 7,472,034 B2
(45) Date of Patent: Dec. 30, 2008

(54) SYSTEM AND METHOD FOR TEST GENERATION FOR SYSTEM LEVEL VERIFICATION USING PARALLEL ALGORITHMS

(75) Inventors: Sanjay Gupta, Austin, TX (US); Steven L. Roberts, Cedar Park, TX (US); Christopher J. Spandikow, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/758,357

(22) Filed: Jun. 5, 2007

(65) Prior Publication Data
US 2007/0233765 A1    Oct. 4, 2007

Related U.S. Application Data

(63) Continuation of application No. 11/146,987, filed on Jun. 6, 2005, now Pat. No. 7,260,495.

(51) Int. Cl.
*G01M 19/00* (2006.01)
*G06F 19/00* (2006.01)
*G01R 31/00* (2006.01)

(52) U.S. Cl. .................. 702/121; 702/118; 702/120; 714/10; 714/11; 714/12; 714/25

(58) Field of Classification Search ................. 702/120, 702/121, 118; 714/10, 11, 12, 25
See application file for complete search history.

(56) References Cited

U.S. PATENT DOCUMENTS

| 5,673,388 | A | 9/1997 | Murthi et al. |
| 6,871,298 | B1 | 3/2005 | Cavanaugh et al. |
| 6,983,398 | B2 | 1/2006 | Prabhu |
| 2003/0130831 | A1 | 7/2003 | Adir |
| 2006/0038893 | A1* | 2/2006 | Knoedgen et al. ........ 348/222.1 |
| 2006/0276998 | A1 | 12/2006 | Gupta et al. |

OTHER PUBLICATIONS

Saha et al., "A Simulation-Based Approach to Architectural Verification of Multiprocessor Systems", IEEE, 1995, pp. 34-37.

* cited by examiner

*Primary Examiner*—Eliseo Ramos-Feliciano
*Assistant Examiner*—Janet L Suglo
(74) *Attorney, Agent, or Firm*—Stephen J. Walder, Jr.; Matthew B. Talpis (57) ABSTRACT

A system and method for test generation for system level verification using parallel algorithms are provided. The present invention generates test patterns for system level tests by exploiting the scalability of parallel algorithms while allowing for data set coloring and expected result checking. Based on the characteristics of the system being tested an iterative parallel algorithm is selected from a plurality of possible parallel algorithms. The selected parallel algorithm is then separated into separate program statements for execution by a plurality of processors. A serial version of the selected algorithm is executed to generate a set of expected results. The devised parallel version of the selected algorithm is then run to generate a set of test result data which is compared to the set of expected results. If the two sets of data match, it is determined that the system is operating correctly.

21 Claims, 3 Drawing Sheets

SYSTEM AND METHOD FOR TEST GENERATION FOR SYSTEM LEVEL VERIFICATION USING PARALLEL ALGORITHMS

This application is a continuation of application Ser. No. 11/146,987, filed Jun. 6, 2005, now U.S. Pat. No. 7,260,495, status awaiting publication.

BACKGROUND OF THE INVENTION

1. Technical Field

The present invention relates generally to an improved data processing system and method. In particular, the present invention provides a system and method for test generation for system level verification using parallel algorithms.

2. Description of Related Art

While known mechanisms for validating the operation of individual devices tend to provide adequate results for validating these devices, traditional approaches to system level validation suffer from a number of problems. These problems stem from the fact that traditional approaches to system level validation are basically attempts to extend the individual unit validation approaches to a system level. These traditional approaches of extending individual unit level validation methods to a system level in which many different units are operating together and often simultaneously, do not provide adequate results for determining valid operation of the system as a whole because they do not scale in a tractable algorithmic fashion.

For example, many researchers today are refining techniques to generate test vectors based on constraint solving abstract models of real systems. This approach derives from processor validation where the models can be expanded to include as much architecture detail as a user can tolerate to provide in the time available. This technology derives interesting scenarios by solving constraints over state variables. However, the required amount of system information that is necessary for this approach grows exponentially over the state space and becomes more complex. Thus, these algorithms do not scale, creating streams of long test vectors that attack state space deep in the design and become non-tractable. Alternatively, in an effort to minimize this complexity and exponential growth, these algorithms may become too abstract to adequately exercise system level transactions in a scenario where the processors are doing work that presents the possibility for contention.

An alternative approach also often employed for system validation is to debug the system using application software. The signature of the debug tests can be used for performance determinations. However, debugging requires intimate knowledge of the behavior of the system and the software operating in the system. While this can be obtained with reference models, the data patterns can not be tailored for quick debug.

SUMMARY OF THE INVENTION

In view of the above, it would be beneficial to have a system and method for test generation that can scale for system level verification. Furthermore, it would be beneficial to have a system and method for test generation for system level verification that does not result in an exponentially growing amount of detail as the size of the system being verified grows.

The present invention provides a system and method for test generation for system level verification using parallel algorithms. With the system and method of the present invention, it is assumed that, at the system level, the parts of the system have integrity when tested in isolated environments. In other words, the parts themselves are operating correctly when independently verified. Thus, the system level verification performed by the mechanisms of the present invention is directed to testing the interaction of the parts on a system level. For example, in a multiprocessor system, the present invention may be used to test the interaction of the processors with system memory so as to verify proper operation of the processors when accessing memory regions of the system memory.

The present invention generates test patterns for system level tests by exploiting the scalability of parallel algorithms while allowing for data set coloring and expected result checking. While the principles of the present invention may be applied to generating test patterns for various types of systems having different types of operating elements, for purposes of explanation, the exemplary embodiments of the present invention will be described in terms of generating test patterns for testing processor memory accesses to ensure proper operation of the system under conditions where contention between processors is most critical.

With the exemplary embodiments of the present invention, based on the characteristics of the system being tested, e.g., number of processors in the system, etc., an iterative parallel algorithm is selected from a plurality of possible parallel algorithms. An address equation is then derived over all memory segments that will allow an array to map to each memory segment. That is, the shared memory, that is to be accessed by the processors of the system during the validation testing, is considered to be an array and an equation is devised for accessing each segment of the memory. This address equation provides a mechanism for accessing memory addresses in any portion of the memory and contains constants which may be constrained so as to force processors to access memory locations in segments allocated to other processor(s) in the system.

The selected parallel algorithm is then separated into separate program statements for execution by a plurality of processors, replacing each array index with the corresponding address equation. The separation of the selected parallel algorithm may be performed on-the-fly or may be the use a pre-established separation of program statements stored in memory, for example. The separate program statements are then compiled into executable programs and loaded into memory for execution by a respective processor in the system.

These operations may be performed, for example, using a parallel compiler to automatically produce parallel code segments from non-parallel high level language code. As these compilers know to target loops in code, each time an index to the array is found in a loop, the compiler may replace the simple index with an equation. For the array, the address equation may include a row and column multiplier so that the array can be mapped to memory in different architecture configurations.

Once an address equation is determined, test data for use with the system level test algorithm is generated and loaded into memory. This test data may be pre-established test data or may be test data that is generated as part of a simulation, for example. A serial version of the selected algorithm is executed to generate a set of expected results, i.e. results that are considered to be from a verified system component. The devised parallel version of the selected algorithm is then run to generate a set of test result data which is compared to the set of expected results. If the two sets of data match, it is determined that the system is operating correctly. If the two sets do not match, then the system is determined to be producing an error.

In one exemplary embodiment of the present invention, a method is provided for performing a system level verification that includes selecting an iterative parallel algorithm for performing the system level verification and separating the iterative parallel algorithm into separate program statements that may be independently executed on separate processors of the data processing system. As an example, the iterative parallel algorithm may be one of a matrix manipulation algorithm, a Fourier transformation, or a character manipulation algorithm. Separating the iterative parallel algorithm into separate program statements that may be independently executed on separate processors of the data processing system may include using a parallel compiler to separate the iterative parallel algorithm into separate program statements.

The iterative parallel algorithm is executed in a serial manner to generate an expected results data set. The separate program statements are executed in a parallel manner to generate a system level test results data set. The system level test results data set may then be compared to the expected results data set and a determination may be made as to whether the system operates properly at a system level based on results of the comparison.

The selection of the iterative parallel algorithm may include receiving system characteristic information and selecting an iterative parallel algorithm based on the system characteristic information. Alternatively, the selection of the iterative parallel algorithm may include displaying a listing of available iterative parallel algorithms for selection by a user and receiving a user selection of the iterative parallel algorithm.

In one exemplary embodiment, an address equation for accessing all segments of a shared memory of the data processing system is generated. The separate program statements are then modified such that indices in the separate program statements are replaced with the address equation. The address equation may include one or more constants, and wherein the constants are set and constrained so as to simulate particular scenarios of operation of the data processing system. In one exemplary embodiment, the address equation constants are constrained so as to ensure that processors of the data processing system must access segments of shared memory allocated to other processors of the data processing system.

In one exemplary embodiment of the present invention, the data processing system that is the subject of the system level test has two processors and the address equation is:

$$\text{Address}_A(x,y) = e_0(x,y)P_0 + e_1(x,y)P_1 + C_A(x,y) + B_A(x,y)$$

where $e_x(x,y)$ is an enable function to enable processor X's segment of memory, $P_x$ is a memory offset for processor X's memory segment, $C_z(x,y)$ is a matrix of cache line offsets for array value Z[x,y], and $B_z(x,y)$ is a matrix of byte offsets for array value Z[x,y].

In another exemplary embodiment of the present invention, an apparatus for performing a system level verification on a data processing system is provided. This apparatus may include a system level test algorithm selection engine that selects an iterative parallel algorithm for performing the system level verification and a parallel compiler that separates the iterative parallel algorithm into separate program statements that may be independently executed on separate processors of the data processing system. The apparatus may further include a serial execution engine that executes the iterative parallel algorithm in a serial manner to generate an expected results data set and a parallel execution engine that executes the separate program statements in a parallel manner to generate a system level test results data set. A results comparison engine may be provided that compares the system level test results data set to the expected results data set and determines if the system operates properly at a system level based on results of the comparison.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

As mentioned above, the present invention is directed to a system and method for test generation for system level verification using parallel algorithms. In exemplary embodiments of the present invention, the system and method are applied to a multi-processor system as a means for verifying that the processors of the system are properly accessing a shared memory of the system. While the exemplary embodiments of the present invention will be described in terms of this particular application of the present invention, it should be appreciated that the present invention is not limited to such. Rather, any system of components may be tested using the mechanisms of the present invention so long as the system permits parallel executions of portions of a testing algorithm.

The invention, as described hereafter, can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1:
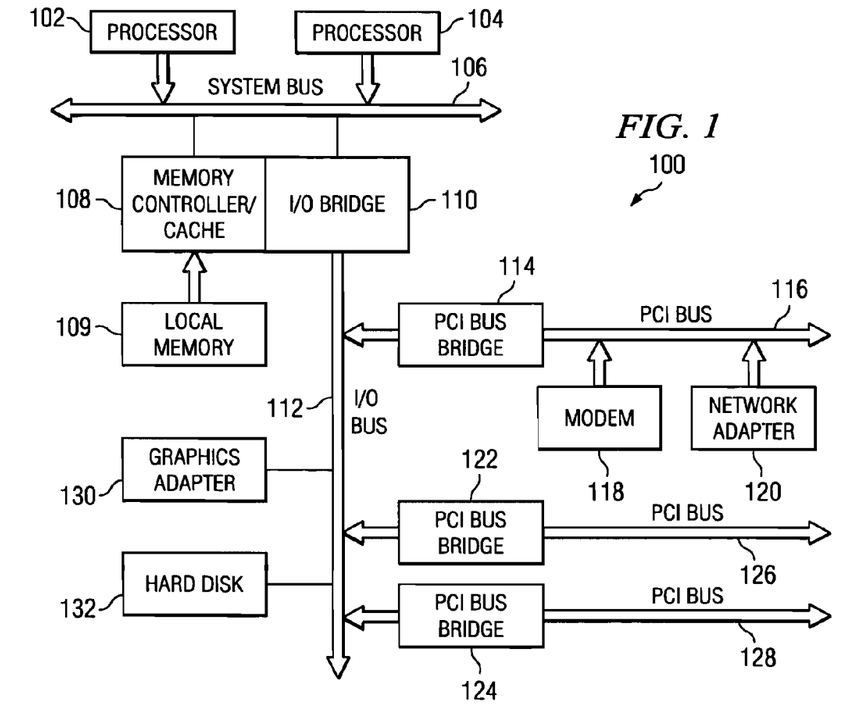
FIG. 1 is an exemplary diagram of multi-processor system in which aspects of the present invention may be implemented.

Referring now to FIG. 1, a block diagram of a data processing system that may be implemented, for example, as a server or client computing device, is depicted in accordance with a preferred embodiment of the present invention. The data processing system shown in FIG. 1 may be a data processing system in which aspects of the present invention are implemented or may be a data processing system that is the subject of system level tests according to the exemplary embodiments of the present invention.

As shown in FIG. 1, data processing system 100 may be a symmetric multiprocessor (SMP) system including a plurality of processors 102 and 104 connected to system bus 106. Alternatively, a single processor system may be employed. Also connected to system bus 106 is memory controller/cache 108, which provides an interface to local memory 109. I/O Bus Bridge 110 is connected to system bus 106 and provides an interface to I/O bus 112. Memory controller/cache 108 and I/O Bus Bridge 110 may be integrated as depicted.

Peripheral component interconnect (PCI) bus bridge 114 connected to I/O bus 112 provides an interface to PCI local bus 116. A number of modems may be connected to PCI local bus 116. Typical PCI bus implementations will support four PCI expansion slots or add-in connectors. Communications links to other computing devices may be provided through modem 118 and network adapter 120 connected to PCI local bus 116 through add-in connectors.

Additional PCI bus bridges 122 and 124 provide interfaces for additional PCI local buses 126 and 128, from which additional modems or network adapters may be supported. In this manner, data processing system 100 allows connections to multiple network computers. A memory-mapped graphics adapter 130 and hard disk 132 may also be connected to I/O bus 112 as depicted, either directly or indirectly.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 1 may be, for example, an IBM Deep Blue system, CMT-5 system, products of International Business Machines Corporation in Armonk, N.Y., or other multi-core processor system, running the Advanced Interactive Executive (AIX) operating system, LINUX operating system, or other type of operating system.

As stated above, the present invention provides a system and method for test generation for system level verification using parallel algorithms. With the system and method of the present invention, it is assumed that, at the system level, the parts of the system have integrity when tested in isolated environments. In other words, the parts themselves are operating correctly when independently verified. Thus, the system level verification performed by the mechanisms of the present invention is directed to testing the interaction of the parts on a system level. For example, in a multiprocessor system, the present invention may be used to test the interaction of the processors with system memory so as to verify proper operation of the processors when accessing memory regions of the system memory.

The present invention generates test patterns for system level tests by exploiting the scalability of parallel algorithms while allowing for data set coloring and expected result checking. While the principles of the present invention may be applied to generating test patterns for various types of systems having different types of operating elements, for purposes of explanation, the exemplary embodiments of the present invention will be described in terms of generating test patterns for testing processor memory accesses to ensure proper operation of the system under conditions where contention between processors is most critical.

With the exemplary embodiments of the present invention, based on the characteristics of the system being tested, e.g., number of processors in the system, etc., an iterative parallel algorithm is selected from a plurality of possible parallel algorithms. Characteristic information for the system may be obtained, for example, from user input, configuration information and/or files associated with the system, or the like. An address equation is then derived over all memory segments that will allow an array to map to each memory segment. This address equation provides a mechanism for accessing memory addresses in any portion of the memory and contains constants which may be constrained so as to force processors to access memory locations in segments allocated to other processor(s) in the system.

The selected parallel algorithm is then separated into separate program statements for execution by a plurality of processors, replacing each array index with the corresponding address equation. The separation of the selected parallel algorithm may be performed on-the-fly or may use a pre-established separation of program statements stored in memory, for example. The separate program statements are then compiled into executable programs and loaded into memory for execution by a respective processor in the system.

These operations may be performed, for example, using a parallel compiler to automatically produce parallel code segments from non-parallel high level language code. As these compilers know to target loops in code, each time an index to the array is found in a loop, the compiler may replace the simple index with an equation. For the array, the equation may include a row and column multiplier so that the array can be mapped to memory in different architecture configurations.

That is, array data can be represented by software in many dimensions. Typically, the array representation is chosen based on a logical relation of the data. When these dimensions are mapped to hardware, the physical structure of the hardware affects the efficiency of data delivery to the user. A two dimensional array is organized in memory such that each row is placed in sequential order. To access a two-dimensional array as a one-dimensional array, a linear equation is used where the column number is multiplied by the row size which is then summed with the row index. As the row size of the array's representation in software might not match the physical structure of memory, to make the most use of memory, a software row will cross the physical memory row. This mismatch forces the computer to exercise different parts of the memory hierarchy. Therefore, substituting a linear equation for the array access allows for changes to the access of different parts of the memory hierarchy.

For example, an array index equation may be of the type MyArray[x][y]→MyArray[xA+y+B] where A and B are constants, x represents a row index, and y is a column index. In the above equation, constant A becomes the row size and constant B is a mechanism for inserting spacing in the data set. The spacing allows for a greater reach into the memory hierarchy.

Test data for use with the system level test algorithm is then generated and loaded into memory. This test data may be pre-established test data or may be test data that is generated as part of as simulation, for example. A serial version of the selected algorithm is executed to generate a set of expected results, i.e. results that are considered to be from a verified system component. The devised parallel version of the selected algorithm is then run to generate a set of test result data which is compared to the set of expected results. If the two sets of data match, it is determined that the system is operating correctly. If the two sets do not match, then the system is determined to be producing an error.

Figure 2:
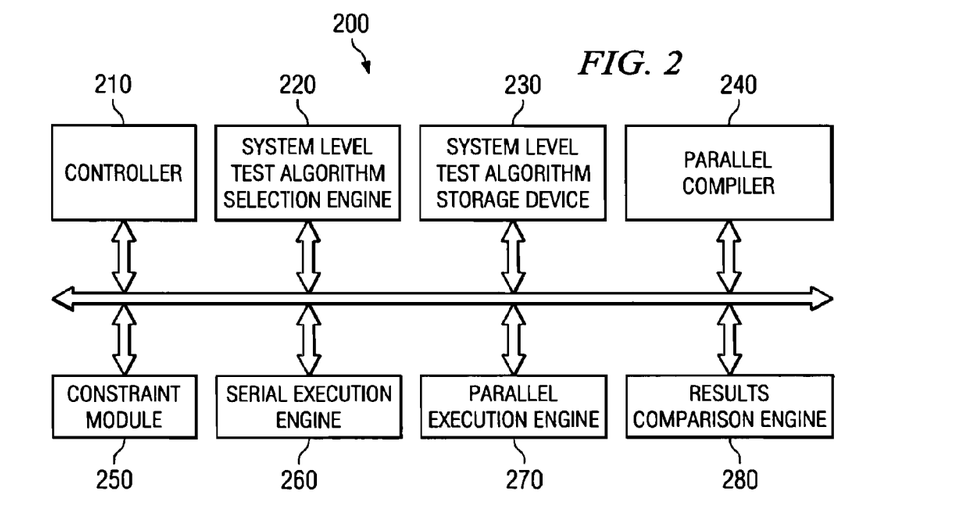
FIG. 2 is an exemplary block diagram of the primary operational components of one exemplary embodiment of the present invention.

FIG. 2 is an exemplary block diagram of the primary operational components of one exemplary embodiment of the present invention. As shown in FIG. 2, the primary operational components of one exemplary embodiment the present invention may include a controller 210, a system level test algorithm selection engine 220, a system level test algorithm storage device 230, a parallel compiler 240, a constraint module 250, a serial execution engine 260, a parallel execution engine 270, and a results comparison engine 280. The controller 210 controls the overall operation of the system level test mechanism 200 and orchestrates the operation of the other elements 210-280.

The controller 210 receives a request to perform a system level test on the particular system in question. This request may be received, for example, via a user interface provided by the controller 210. The controller 210 then requests that the system level test algorithm selection engine 220 select a system level test algorithm for use in testing the system's operation at the system level. This selection may be performed automatically based on selection criteria that is pre-established or entered by a user via the user interface provided by the controller 210. In a preferred embodiment of the present invention, the criteria are preferably associated with characteristics of the system being tested. For example, a particular system level test algorithm may be selected based on the number of processors in the system and/or other system characteristics.

Alternatively, a user may specifically select a system level test algorithm to utilize during the testing via the user interface provided by the controller 210. In such an embodiment, the controller 210 may request that the system level test algorithm selection engine 220 retrieve information about the available system level test algorithms so that the controller 210 may display a listing of available system level test algorithms for selection by the user.

The system level test algorithm may be selected from one or more system level test algorithms stored in the system level test algorithm storage device 230. The system level test algorithms may take many different forms including matrix operations, Fourier transformations, character manipulation algorithms, or any other type of algorithm that can be broken down into parallel independent program statements. For purposes of the following description, it will be assumed that the system level test algorithm that is selected is a matrix multiplication algorithm.

The information regarding the selected system level test algorithm is read from the system level test algorithm storage device 230 and used to generate program statements that may be executed in parallel. This information may include just the test algorithm itself, or may include additional information, such as information regarding the broken down program statements associated with the system level test algorithm.

The parallel compiler 240 may be used to break down the selected system level test algorithm into parallel program statements, determine an address equation for accessing all segments of a shared memory, and to modify the broken down algorithm based on the address equation, as described in greater detail hereafter. The separate program statements are then compiled by the parallel compiler 240 into executable programs which are loaded into memory for execution by respective processors of the system.

Thereafter, the constants of the separate executable programs are constrained by the constraint module 250 so as to ensure that the processors of the system must access segments of the shared memory allocated to other processor(s) of the system. This is done so as to ensure that the most stressful operation of the system is tested, i.e. contention between processors for access to memory. In addition, this ensures that the processors must use the system bus to access memory segments associated with the other processors and thus, exercises the bus during memory accesses to ensure proper operation of the bus.

The serial and parallel execution engines 260 and 270 then execute the constrained system level test algorithm in a serial and parallel manner, respectively. The serial execution is used to generate a set of expected data results against which the parallel execution results are compared. This comparison is performed by the comparison engine 280 which, based on the results of the comparison, determines if the system is operating correctly at the system level. That is, if the data generated by the parallel execution of the system level test algorithm matches the expected data results generated by the serial execution of the system level test algorithm, then the system is operating properly. Otherwise, an error in operation has occurred and a notification of such an error may be generated for output to a system designer.

To further explain the way in which the present invention provides a mechanism for efficiently performing system level validation, an example implementation of the present invention will be described with reference to FIGS. 3-6. The example described hereafter is directed to testing processor memory accesses in a multi-processor system. The particular algorithm selected for this system level test is a matrix multiplication. For example, let A[0 ... M−1, 0 ... N−1] and B [0 ... N−1, 0 ... R−1] be two matrices of numerical values. The product of matrices A and B is matrix C given by:

$$C[i,k] = <+j:0 = \leq j \leq N::A[i,j] X B[j,k]>$$

which reads that C's index [i,k] is assigned the summation over j's range of 0 to N−1 of A[i,j] multiplied by B[j,k].

A uniprocessor implementation solves this by nesting over i, k, and j where i, j, k are quantified as follows:

$$0 <= i < M, 0 <= j < N, 0 <= k < R$$

This algorithm is inherently parallel by distributing the range of i and k over the target processors:

$$<\|i,k::C[i,k] = <+j::A[i,j] X B[i,k]>$$

which reads that the assignment to C[i,k] can be done in any order over the ranges of i and k.

Figure 3:
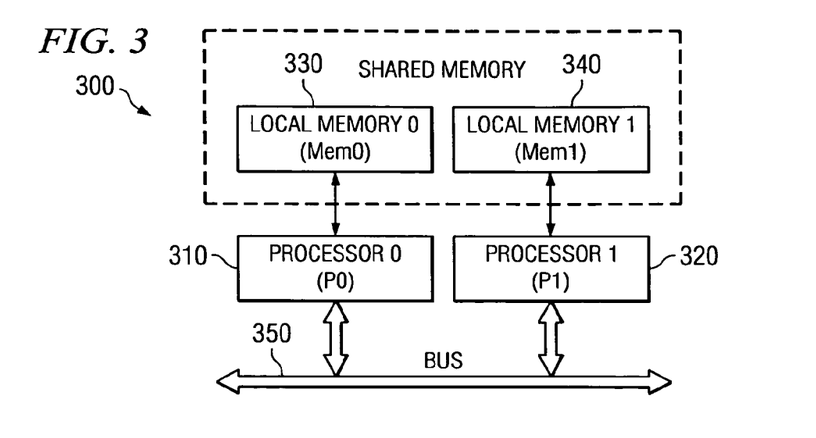
FIG. 3 is an exemplary diagram illustrating a simplified exemplary diagram of a two-processor system on which a matrix multiplication system level test algorithm is executed.

Since the above equation may be executed in any order over the ranges of i and k, it follows that this equation may be separated for parallel execution on two or more processors. FIG. 3 provides a simplified exemplary diagram of a two-processor system 300 over which the matrix multiplication equation set forth above may be distributed. With the system shown in FIG. 3, it is assumed that each processor 310 and 320 can directly access its local memory 330 and 340, respectively and can access other memory regions via the bus 350. The local memories are portions of a shared memory that are allocated to the processors 310 and 320 uniformly. Memory accesses are a cache line at a time and a cache line is 128 bytes.

With this system as a basis, the methodology of the exemplary embodiments of the present invention involves first selecting an algorithm to use in testing the operation of the system at a system level. As mentioned previously above, this selection may be based, for example, upon the characteristics of the system being tested. For example, since the system 300 in FIG. 3 is a two processor system, a matrix multiplication algorithm such as that described above is selected to test the system level operation of the system 300. Thus, the matrix multiplication algorithm A[M,N]*B[N,R]=C[M,R] is selected. For this example, the values of M, N, and R are set to 2.

Figure 4:
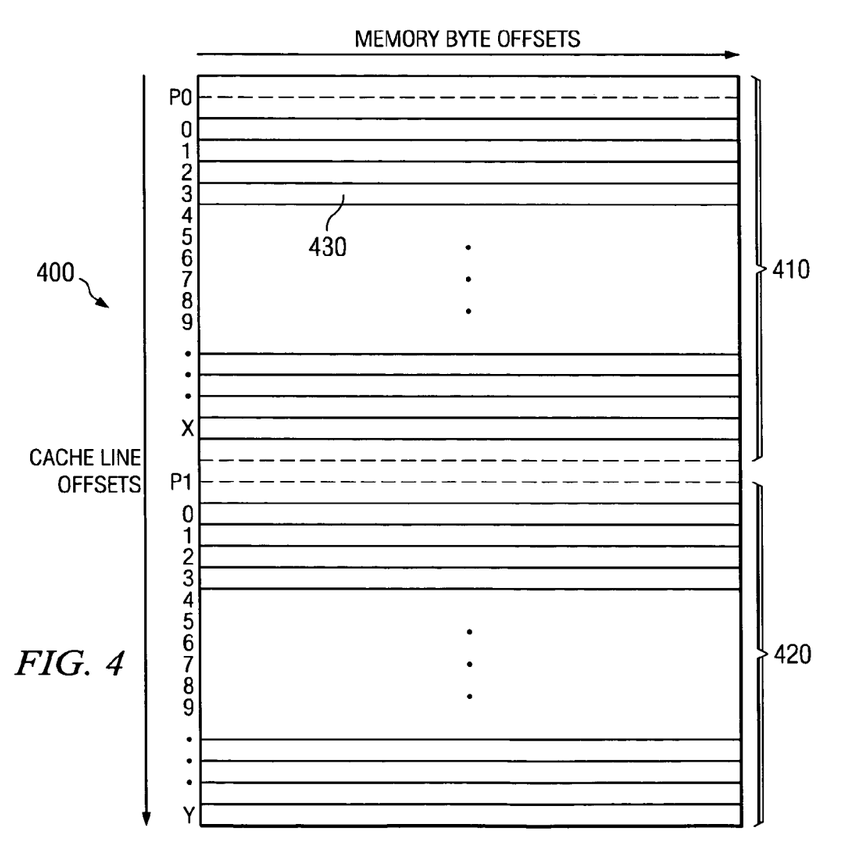
FIG. 4 is an exemplary diagram illustrating a shared memory in accordance with one exemplary embodiment of the present invention.

The equation for all memory segments is then derived for an array. That is, as shown in FIG. 4, the shared memory 400 that is to be accessed by the processors 310 and 320 during the validation testing is considered to be an array and an equation is devised for accessing each segment of the memory. As shown in FIG. 4, the memory is partitioned into a first segment 410 allocated to processor 0, i.e. processor 310, and a second segment 420 allocated to processor 1, i.e. processor 320. Each segment is comprised of cache lines 430 with each cache line being identified by a cache line offset from a beginning of the segment 410, 420. Individual data stored in each cache line is accessible using a memory byte offset. Thus, the combination of the processor segment, cache line offset and memory byte offset uniquely identifies a data location within the shared memory 400.

Based on FIG. 4, the equation for identifying the address of a data location within an array is as follows:

$$Address_A(x,y) = e_0(x,y)P_0 + e_1(x,y)P_1 + C_A(x,y) + B_A(x,y)$$

where $e_x(x,y)$ is an enable function to enable processor X's segment of memory, $P_x$ is a memory offset for processor X's memory segment, $C_z(x,y)$ is a matrix of cache line offsets for array value Z[x,y], and $B_z(x,y)$ is a matrix of byte offsets for array value Z[x,y]. The value of $e_x(x,y)$ is either 0 or 1 with "0" representing that processor X's segment of memory is not enabled and "1" representing that processor X's segment of memory is enabled. Thus, the address equation shown above permits data accesses to be distributed to both memory segments for processor 0 and processor 1. As a result, all of the memory segments may be exercised during the system level test, as discussed hereafter. Of course, depending upon the particular system configuration, this equation may take different forms. For example, additional terms may be provided in the address equation for additional processors in a multi-processor system having more than two processors.

Having identified an equation for all memory segments for an array, the selected algorithm is split up into program segments by the number of processors. For example, splitting up the algorithm <||i,k::C[i,k] = <+j::A[i,j] X B[j,k]> for execution on two processors produces the following program segments:

$$P0 => C[0,k] = <+j::A[0,j] X B[j,k]>; \text{ and}$$

$$P1 => C[1,k] = <+j::A[1,j] X B[j,k]>$$

where i is hard-coded for each processor and values for j and k are looped through to complete the system level test. Substituting the above address equation into the split up algorithm results in:

$$P0 => C[0,k] = <+j::*(Address_A[0,j])X*(Address_B[j,k])>$$

$$P1 => C[1,k] = <+j::*(Address_A[1,j])X*(Address_B[j,k])>$$

These program segments are compiled and loaded for execution by the processors. The constants in the Address( ) equations are then constrained. For example, let each data value rest in an incrementing cache line from offset $L_p$, where p is the processor number. Let each data value reside in the same byte offset of a given cache line(0). Also, let processor 0 be active for A[1,y] and B[x,0]. Thus:

$$C_A(x,y) = L_p + [(x+1)y]*128$$

$$B_A(x,y) = 0x0$$

$$e_{A0}(x,y) = 1, x=1 \text{ else } 0$$

$$e_{B0}(x,y) = 1, y=0 \text{ else } 0$$

$$e_{A1}(x,y) = 1, x=0 \text{ else } 0$$

$$e_{B1}(x,y) = 1, y=1 \text{ else } 0$$

The constants are determined in accordance with the purpose of the test. For example, if a user wishes to increase the number of memory accesses, the byte offset is set such that the data being accessed is not on a single cache line. Thus, two cache lines must be accessed to get one data value. Alternatively, if a user wanted to limit the amount of data accesses, the constants may be set such that multiple data sets may be stored on a single cache line. These constants may be adjusted by the user, although it is possible to abstract the biasing for certain types of data sets.

The constraints on the constants are used to map the software representation of an array to the hardware. If one were only concerned about the first level of a 128 byte cache, any access to an array with a row size of more than 128 bytes apart exercises the hardware in the same manner. Thus, by forcing a constraint, more variety in the test scenarios is made possible. Determining the range of constraints is a function of the architecture of the hardware. For example, with the exemplary algorithm chosen above, and assuming a two processor system, constraints may be established for simulating the following scenarios:

(1) all data in local memory segment allocated to one processor, all data fits into the cache;

(2) data on both local memory segments allocated to both processors, all data fits into the cache;

(3) data on both local memory segments allocated to both processors, but split so a percentage of data required is not local for that processor, i.e. processors must access portions of other processor's memory segment;

(4) data on both local memory segments allocated to both processors, but data is on local memory segment of processor that is not responsible for calculations using that data, i.e. all memory accesses for a processor are to the other processor's local memory segment; and (5) data on both local memory segments allocated to both processors, but data is on local memory segment of processor that is not responsible for calculations using that data, and no byte is in a cache line (multiple cache lines accesses are necessary).

Many other scenarios may be generated by a proper setting and constraint of the constants in the selected algorithm and program segments generated based on the selected algorithm without departing from the spirit and scope of the present invention.

Figure 5:
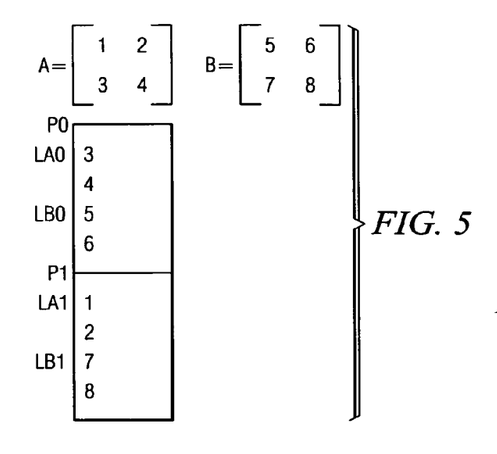
FIG. 5 is an exemplary diagram illustrating test data matrices and the way in which these matrices are loaded into segments of a shared memory in accordance with one exemplary embodiment of the present invention.

Having compiled and loaded the program segments of the split algorithm and constrained the constants of the program segments, the test data for performing the system level test is then generated and loaded into memory according to the Address equation derived above. FIG. 5 illustrates the matrices A and B as they are loaded into the memory depicted in FIG. 4 in accordance with the above Address equation.

The serial version, i.e. uniprocessor version, of the system level test algorithm is then executed using the generated and loaded test data to determine what result is obtained. Since the serial version of the execution of the system level test algorithm is not subject to contention between processors for accessing portions of the shared memory, the results generated by the serial version will be considered to be the correct results that should be obtained by the parallel version of the system level test algorithm. Thus, the serial version execution provides the correct result against which the results of the parallel execution of the system level test algorithm is compared.

That is, following serial execution of the system level test algorithm, the parallel version of the test algorithm, as devised in the manner set forth above, is executed to generate parallel system level test algorithm results. These parallel system level test algorithm results are then compared against the result obtained from executing the serial version of the test algorithm. If the two sets of results match, then the system is verified as operating properly. If the two sets of results do not match, then an error result is generated.

Figure 6:
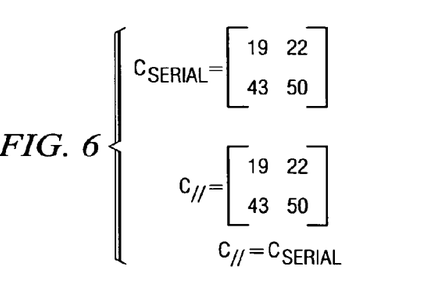
FIG. 6 is an exemplary diagram illustrating result matrices generated by serial and parallel executions of a system level test algorithm in accordance with one exemplary embodiment of the present invention.

FIG. 6 illustrates the resulting matrices of values generated by the serial execution of the system level test algorithm and the parallel execution of the system level test algorithm. As shown in FIG. 6, the two resulting matrices are equal and thus, it is verified that the processors are properly accessing each other's memory segments and that contention between the processors does not result in processors accessing address locations such that it corrupts the data stored in these memory locations. If a processor were to write data to a portion of the memory in an improper manner, the data stored in the accessed memory location may be corrupted and thus, the data values generated in the resulting matrix may differ from the expected results. For example, data corruption may result from a scenario where data is requested by a processor but never delivered. The requesting processor may hang or use stale data. In the case of stale data, eventually, this would produce a data mismatch or data corruption. As a further example, if there is a bad timing window in the memory sub-system, data may be shared with another processor in the middle of updating a cache line. The partial update would eventually produce a data mismatch or data corruption.

Figure 7:
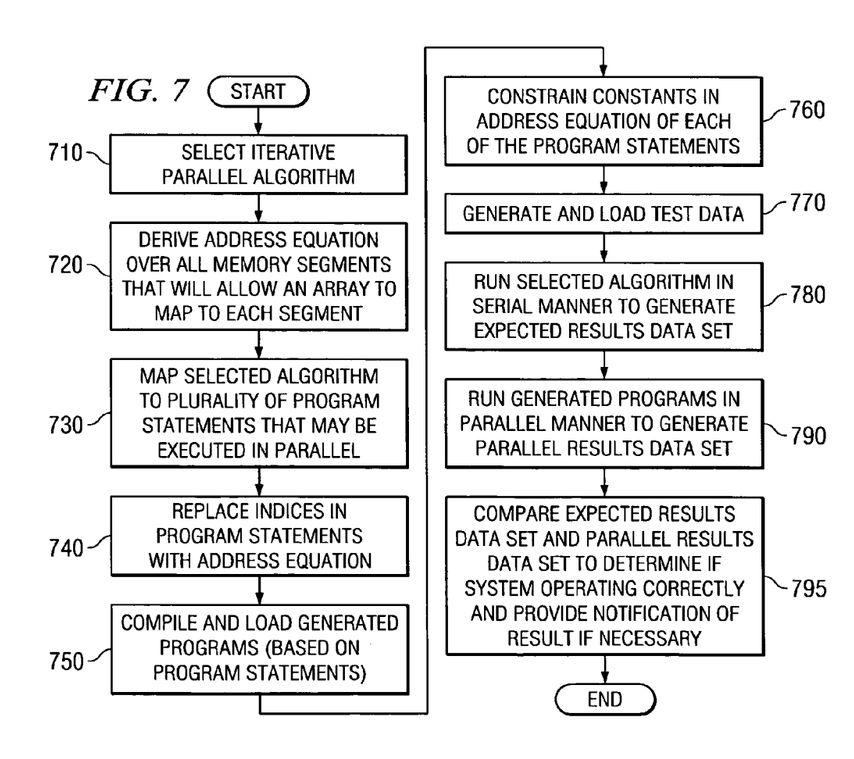
FIG. 7 is a flowchart outlining an exemplary operation of one exemplary embodiment of the present invention.

FIG. 7 is a flowchart outlining an exemplary operation of the present invention. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

As shown in FIG. 7, the operation starts by selecting an iterative parallel algorithm with a unique fixed point (step 710). That is, the parallel algorithm has a determinate termination condition. Since the programs are parallel, it may be that different processors execute different portions of the algorithm at different speeds. Therefore, between the start and finish of an algorithm, the series of computations can be different. For example, if the numbers from 1 to 5 are being summed and the result placed in memory location X, X could be 1, 3, 6, 10, 15 or 5, 9, 12, 14, 15. At the fixed point of memory location X, the value is 15. A unique fixed point means that there is only one such point. If one tried to implement a parallel algorithm for operation that was not commutative, a set of fixed points would be obtained, not a unique fixed point.

As discussed above, the selection of an iterative parallel algorithm may be performed from a plurality of possible iterative parallel algorithms based on selection criteria, such as characteristics of the system being tested. Alternatively, the same iterative parallel algorithm may be utilized for a plurality of different systems such that only a single iterative parallel algorithm is provided and thus, selected.

An equation over all memory segments that will allow an array to map to each segment is derived (step 720). As discussed above, this equation provides a means to access different addresses of a shared memory in all segments of the shared memory. The selected algorithm is then mapped to a plurality of program statements that may be executed in parallel by the processors of the system (step 730). The array indices in the program statements are then replaced with the address equation derived in step 720 (step 740).

The generated programs are then compiled and loaded into memory so that they may be executed by their respective processors (step 750). For each array in the program statements, the constants in the address equation is constrained so as to ensure that each processor must access the memory segments associated with the other processor(s) of the system (step 760).

The test data upon which the programs are to operate is then generated and loaded into memory (step 770). The algorithm is then run in a serial manner and the results are stored as expected results for later comparison (step 780). The programs generated above are then run in parallel with the results being stored as a separate set of values for comparison with the results of the serial execution of the selected algorithm (step 790). The results of the parallel execution are then compared to the results of the serial execution and a determination is made, based on the comparison, as to whether the system is operating correctly or whether an error has occurred (step 795). A notification of any error state, or proper operational state, may be provided as required by the particular embodiment of the present invention. This process may be repeated from step 760 as desired.

Using the above methodology to perform test generation provides a scalable platform on which system specific tests, e.g., interrupt testing, can be applied. The methodology is iterative over the class of parallel algorithms and iterative over the system parameters which determine data transfer. The iterative parallel algorithms are chosen to ensure an easy mapping to any architecture and to increase the randomness of data access.

Because the algorithm complexity is separated from the algorithmic complexity of test generation, data sets can be computed as part of simulation, thereby making the present invention suitable for accelerated simulation. For example, in the matrix multiplication example set forth above, over 300 direct memory accesses (DMAs) can be generated with a simple operation on a 10 by 10 matrix. The matrices may be generated and the algorithm may be parameterized in less than a minute of computing time compared to the 20-30 minutes required using a constraint solver approach in the prior art. In addition, as the data is independent from the algorithm and results are computed on a processor before distributing the task to all processors, the technique of data coloring can be employed to enable the data vales to be of more value while debugging.

The notion of data "coloring" is a simulation-based method for verifying coherency in weakly ordered shared memory multiprocessor systems. Data coloring is advantageous in system level scenarios because data coloring focuses on memory coherence in weakly ordered systems by checking correctness on valid sets, i.e. sets of atomically accessed data regions. As such, the software required for checking such rules is minimal in contrast to the end to end checking done in known system level verification systems. For more information regarding data coloring, reference may be made to "A Simulation-Based Approach to Architectural Verification of Multiprocessor Systems," IEEE publication, 1995.

The addition of data coloring may be provided in the methodology described above, for example, as a series of operations performed after generation/loading of the test data (step 770) and before running the algorithm in serial and parallel executions (step 780). This series of operations may involve, for example, distributing the data set over memory, or the system, for example, forming colored sets by identifying data elements of the same atomic units (e.g., cache lines), generating expected ordering results, and distributing data coloring expected results over the memory, system, or the like.

As mentioned above, an implementation of the present invention may include a parallel compiler to automatically produce parallel code segments from non-parallel high level language code. The parallel compiler targets loops in an algorithm such that each time an index to an array is found in a loop, the compiler may replace the simple index with an equation. For an array, the equation would include a row and column multiplier so that the array can be mapped to memory in different architecture configurations. An implementation of the present invention may include all the mechanisms described above running on-the-fly during a simulation or having the test algorithm, memory mapping equation, processor program statements, and compilation of these processor program statements, i.e. steps 710-750, being done a priori.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for performing a system level verification, comprising:
   separating a system level test algorithm into separate parallel program statements;
   constraining the separate parallel program statements such that processors of the data processing system must access segments of a shared memory allocated to another processor of the data processing system;
   executing the system level test algorithm in a serial manner to generate an expected results data set;
   executing the constrained separate parallel program statements in a parallel manner to generate a system level test results data set;
   comparing the system level test results data set to the expected results data set; and
   providing an output indicative of either an error state or a proper operational state based on results of the comparison.

2. The method of claim 1, further comprising:
   receiving system characteristic information of the data processing system; and
   selecting a system level test algorithm based on the system characteristic information.

3. The method of claim 2, further comprising:
   displaying a listing of available system level test algorithms for selection by a user; and
   receiving a user selection of the system level test algorithm.

4. The method of claim 1, further comprising:
   generating an address equation for accessing all segments of the shared memory of the data processing system; and
   modifying the separate parallel program statements such that indices in the separate parallel program statements are replaced with the address equation.

5. The method of claim 4, wherein the data processing system has two processors, and wherein the address equation is:

$$\text{Address}_A(x,y) = e_0(x,y)P_0 + e_1(x,y)P_1 + C_A(x,y) + B_A(x,y)$$

where $e_x(x,y)$ is an enable function to enable processor X's segment of memory, $P_x$ is a memory offset for processor X's memory segment, $C_Z(x,y)$ is a matrix of cache line offsets for array value Z[x,y], and $B_Z(x,y)$ is a matrix of byte offsets for array value Z[x,y].

6. The method of claim 4, wherein the address equation includes one or more constants, and wherein constraining the separate parallel program statements comprises setting and constraining the constants so as to simulate particular scenarios of operation of the data processing system.

7. The method of claim 6, wherein the constants are constrained so as to ensure that the processors of the data processing system must access segments of shared memory allocated to other processors of the data processing system.

8. The method of claim 1, wherein the system level test algorithm is one of a matrix manipulation algorithm, a Fourier transformation, or a character manipulation algorithm.

9. The method of claim 1, wherein separating the system level test algorithm into separate parallel program statements that may be independently executed on separate processors of the data processing system includes using a parallel compiler to separate the system level test algorithm into separate parallel program statements.

10. The method of claim 1, wherein:
the system level test algorithm comprises a set of program statements,
the separate parallel program statements are a subset of the set of program statements,
the system level test algorithm is executed in a serial manner on a first processor, and
the constrained separate parallel program statements are executed in a parallel manner on a plurality of processors including at least one second processor different from the first processor.

11. A data processing system, comprising:
a processor; and
a memory coupled to the processor, wherein the memory comprises instructions which, when executed by the processor, cause the processor to:
separate a system level test algorithm into separate parallel program statements;
constrain the separate parallel program statements such that processors of the data processing system must access segments of a shared memory allocated to another processor of the data processing system;
execute the system level test algorithm in a serial manner to generate an expected results data set;
execute the constrained separate parallel program statements in a parallel manner to generate a system level test results data set;
compare the system level test results data set to the expected results data set; and
provide an output indicative of either an error state or a proper operational state based on results of the comparison.

12. The system of claim 11, wherein the instructions further cause the processor to:
receive system characteristic information of the data processing system; and
select a system level test algorithm based on the system characteristic information.

13. The system of claim 11, wherein the instructions further cause the processor to:
display a listing of available system level test algorithms for selection by a user; and
receive a user selection of the system level test algorithm.

14. The system of claim 11, wherein the instructions cause the processor to implement a parallel compiler, and wherein the parallel compiler generates an address equation for accessing all segments of the shared memory of the data processing system and modifies the separate parallel program statements such that indices in the separate parallel program statements are replaced with the address equation.

15. The system of claim 14, wherein the data processing system has two processors, and wherein the address equation is:

$$\text{Address}_A(x,y) = e_0(x,y)P_0 + e_1(x,y)P_1 + C_A(x,y) + B_A(x,y)$$

where $e_x(x,y)$ is an enable function to enable processor X's segment of memory, $P_x$ is a memory offset for processor X's memory segment, $C_Z(x,y)$ is a matrix of cache line offsets for array value Z[x,y], and $B_Z(x,y)$ is a matrix of byte offsets for array value Z[x,y].

16. The system of claim 14, wherein the address equation includes one or more constants, and wherein the constants are set and constrained so as to simulate particular scenarios of operation of the data processing system.

17. The system of claim 16, wherein the constants are constrained so as to ensure that processors of the data processing system must access segments of shared memory allocated to other processors of the data processing system.

18. The system of claim 11, wherein the system level test algorithm is one of a matrix manipulation algorithm, a Fourier transformation, or a character manipulation algorithm.

19. A computer program product comprising a computer useable medium having a computer readable program, wherein the computer readable program, when executed on a computer, causes the computer to:
separate a system level test algorithm into separate parallel program statements;
constrain the separate parallel program statements such that processors of the data processing system must access segments of a shared memory allocated to another processor of the data processing system;
execute the system level test algorithm in a serial manner to generate an expected results data set;
execute the constrained separate parallel program statements in a parallel manner to generate a system level test results data set;
compare the system level test results data set to the expected results data set; and
provide an output indicative of either an error state or a proper operational state based on results of the comparison.

20. The computer program product of claim 19, wherein the computer readable program further causes the computer to:
generate an address equation for accessing all segments of the shared memory of the data processing system; and
modify the separate parallel program statements such that indices in the separate parallel program statements are replaced with the address equation.

21. The computer program product of claim 20, wherein the address equation includes one or more constants, and wherein the computer readable program further causes the computer to set and constrain the constants so as to simulate particular scenarios of operation of the computer.

* * * * *